United States Patent [19]

Del Zotto

[11] Patent Number: 5,720,467
[45] Date of Patent: Feb. 24, 1998

[54] MODULAR CURB AND SEWER CASTING FORM

[76] Inventor: William M. Del Zotto, 2300 Commonwealth Ave., Duluth, Minn. 55808-1699

[21] Appl. No.: 564,904

[22] Filed: Nov. 29, 1995

[51] Int. Cl.$^6$ ............................................. B28B 7/02
[52] U.S. Cl. ........................... 249/155; 249/8; 249/163
[58] Field of Search .......................... 249/8, 136, 2, 249/163, 155; 425/454, 453

[56] References Cited

U.S. PATENT DOCUMENTS

| | | | |
|---|---|---|---|
| 1,279,059 | 9/1918 | Whiteway et al. | 249/8 |
| 2,180,842 | 11/1939 | Winding et al. | 249/8 |
| 2,586,912 | 2/1952 | Braun | 249/8 |
| 2,610,381 | 9/1952 | Rosati et al. | 249/2 |
| 2,809,414 | 10/1957 | Mitchell | 249/2 |
| 3,389,646 | 6/1968 | Ruggles | 249/8 |
| 4,272,130 | 6/1981 | Demonsablon et al. | 425/454 |
| 4,515,552 | 5/1985 | Kataishi et al. | 425/454 |
| 4,844,403 | 7/1989 | Castle | 249/163 |

*Primary Examiner*—Thomas R. Weber
*Attorney, Agent, or Firm*—D. L. Tschida

[57] ABSTRACT

A multi-section form for casting sewer inlet ports to manhole standpipes with right, left or bi-winged curb sections. The form includes multiple sections which can be arranged to segregate the form interior to cast inlets with a preferred arrangement of one or more curb extension wings. Pre-assembled rebar and manhole port assemblies mount within the arranged form sections, along with a multi-section form which defines a top cover and inlets to a center manhole port. An extension form wall at the manhole port assembly defines an overflow conduit. The casting form is supported to a low profile casting table which defines a bottom form wall and includes a hydraulic lift for tilting the table top to eject a cast part.

10 Claims, 8 Drawing Sheets

MODULAR CURB AND SEWER CASTING FORM

BACKGROUND OF THE INVENTION

The present invention relates to precast concrete forms and, in particular, to a form for casting modular sewer inlet ports which mate to a manhole standpipe of a sewer system and an adjoining curb and/or sidewalk. The form can be arranged to cast right, left, or bi-winged sewer inlets having top covers.

Traditionally, sewer inlets have been cast on site with the erection of a specifically desired form to mate with a previously positioned manhole standpipe and curbing forms. The forms are frequently constructed of wood and the sewer inlet was poured as part of the curbing pour. The necessity of separately framing each form, however, is time consuming and often results in non-standard inlets with each street improvement.

Attempts have also been made to pre-cast the sewer inlets in factory settings. The forms were constructed to pour the inlets in an upside down condition, however, which prevents broom finishing the top covers, and which is a requirement of most approval authorities. The forms were also constructed to specific constructions, such that a pre-caster must maintain three sets of forms for typical right, left, and bi-wing inlet configurations.

In appreciation of the foregoing deficiencies, the present form was developed to provide a modular casting assembly which is arrangeable to permit casting multiple structures with a single form. The form walls mount to provide an unobstructed cavity which receives prefabricated rebar supports, a manhole port assembly, and a multi-section top wall insert form which defines a gutter or inlet access port and a top cover to an adjoining manhole port. The manhole port assembly provides a three wall steel plate assembly which aligns to a facing wall and the top wall insert form. An overflow extension form wall mounts to the front form walls in alignment with the manhole port. The casting form mounts to a tilting pneumatic or hydraulic table to provide a bottom form wall.

SUMMARY OF THE INVENTION

It is accordingly a primary object of the present invention to provide a multi-purpose casting form which casts covered sewer inlets having adjoining curbing wings.

It is a further object of the invention to provide a casting form having walls and inserts which are arrangeable as desired to produce right, left and hi-wing sewer inlet structures.

It is a further object of the invention to provide a form which permits broom finishing the exposed surfaces.

It is a further object of the invention to provide a form supported to a moveable work surface and which work surface defines a form wall.

It is a further object of the invention to provide a table top work surface which is pivotally retained to a support frame and intermediate of which a lift means can pivot the table to facilitate part removal or eject cast parts upon the removal of selected form walls.

Various of the foregoing objects, advantages and distinctions of the invention are obtained in a preferred form configured to cast multiple arrangements of curbing wings at a sewer inlet port, which mount to conventional manhole standpipes, and which aligns to street and gutter curbing. A multi-section top cover insert form and manhole port insert mount within the form to define a tapered inlet port at the curbing leading to a center manhole port. The manhole port is sized to mate with a sewer standpipe.

The form is configured to provide multi-section rear and front walls, a unitary facing wall and right and left end walls. The sectional top cover form insert and manhole port insert mounts adjacent the facing wall to define the cavities of the inlet and manhole ports. An overflow form extends forward of the manhole port form. Pre-constructed rebar supports are fitted to the open cavities of the form to stabilize the cast concrete in conventional fashion. Formed metal walls of the manhole port insert are cast into the completed structure.

The front and rear casting walls are constructed of multiple sections which mount to right and left end walls. The facing wall extends between the end walls and the top wall insert form and manhole port insert are secured to the facing wall. The sections of the front and rear walls and the top wall insert form are adapted to be selectively positioned depending on whether a right or left single winged curbed inlet or a bi-winged curb inlet is being cast.

The overflow form assembly mounts to the front wall sections and extends forward of the manhole port.

The casting table is sized to receive the bi-winged form and measures approximately 8×20 feet. The table can be constructed to be stationary or permit tilting. A framework including multiple struts is fitted to a lower table surface to maintain structural integrity and prevent warping.

In a tilting table construction, hydraulic or pneumatic cylinders extend from supporting legs to the table top. Controls fitted to the cylinders pivot the table between horizontal and inclined positions to facilitate removal of cast parts, once formed, either with the aid of a hoist or by ejecting the cast part onto an adjoining work surface. Support braces pivot with the lifting of the table top to retain the table in an elevated condition. Fasteners can secure the sections of the casting form to the table top.

DESCRIPTION OF THE PREFERRED EMBODIMENT

Figure 1:
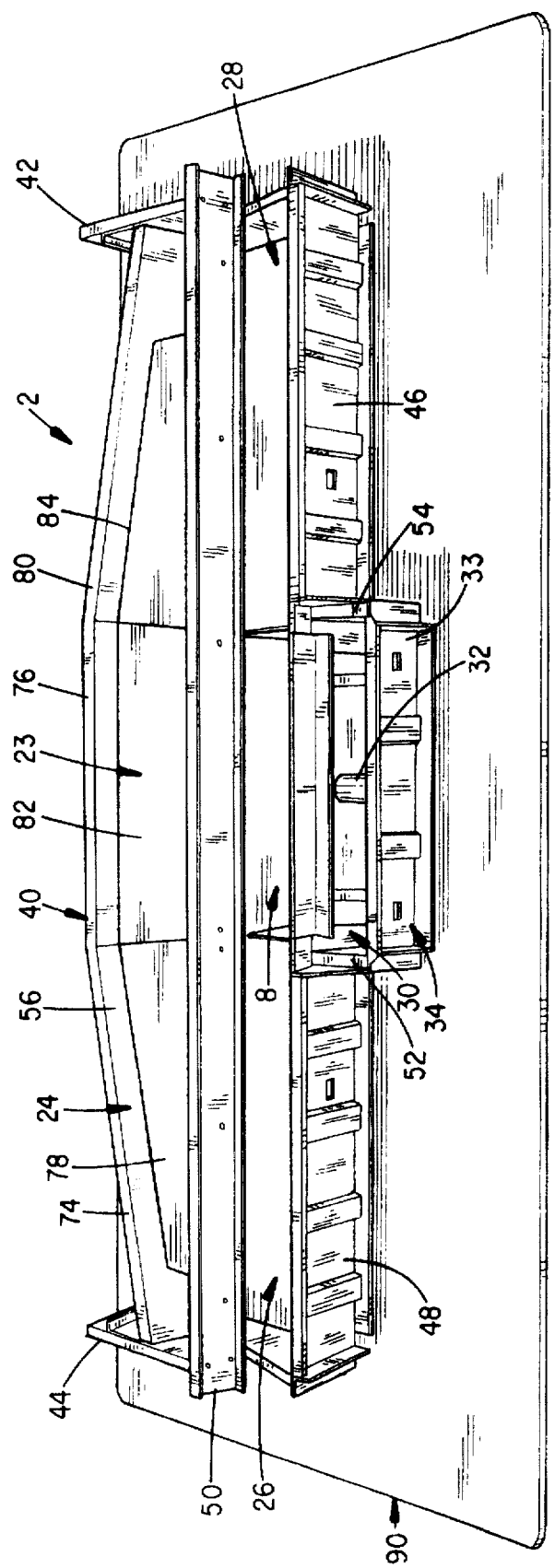
FIG. 1 is a perspective drawing of a bi-wing arrangement of the form for casting concrete, covered bi-wing sewer inlets.
Figure 2:
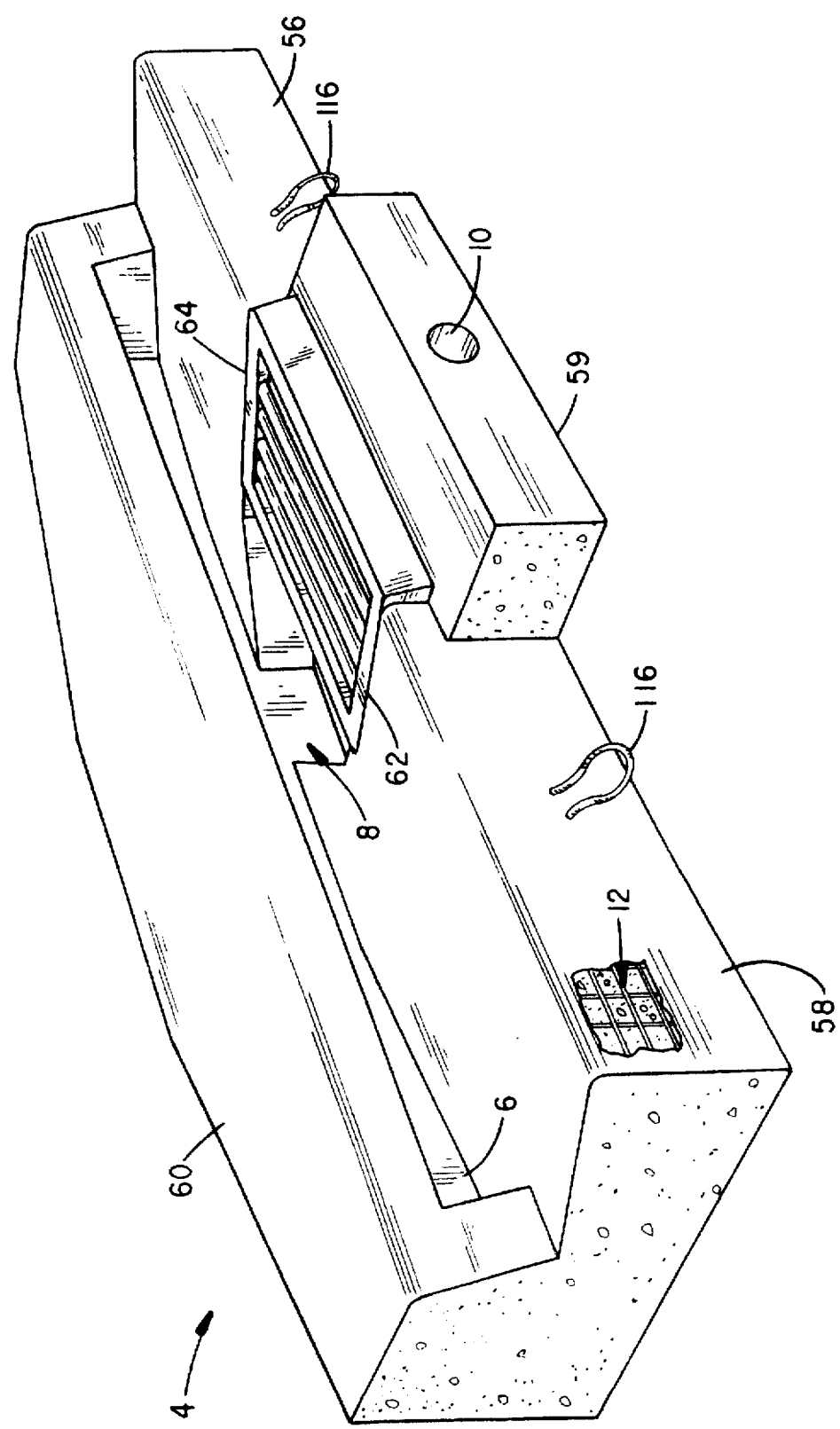
FIG. 2 is a perspective drawing to a cast concrete, bi-wing covered sewer inlet.

Referring to FIG. 1 and 2 perspective drawings are shown to a casting form 2 and a precast concrete, covered bi-wing sewer inlet 4. Bi-wing sewer ports 4 are most frequently used to interrupt relatively long, straight lengths of curbing. The spacing between the sewer inlet ports 4 typically depends on pertinent municipal codes and typical environmental conditions at the installation site.

The sewer inlet 4 is constructed to mount to a conventional manhole standpipe, such as used in the construction of street and parking lot sewer systems. The curbing wings of the inlet port 4 receive water directed from adjoining lengths of curbing. The water is directed from the curbing to right and/or left, sloped inlet cavities 6 where the water is redirected to a center manhole port 8 and the lower lying manhole standpipe.

An overflow port 10 projects from the front of the sewer inlet 4 and receives overflow through crossover conduits (not shown) from neighboring inlet ports 4 to relieve excess water which can collect under periodic flood conditions. That is, if a primary sewer line and sewer inlet becomes plugged or fills too rapidly in heavy rains and backs up through the manhole port 8, the overflow is redirected via the overflow port 10 to an adjoining sewer inlet port 4.

Figure 7:
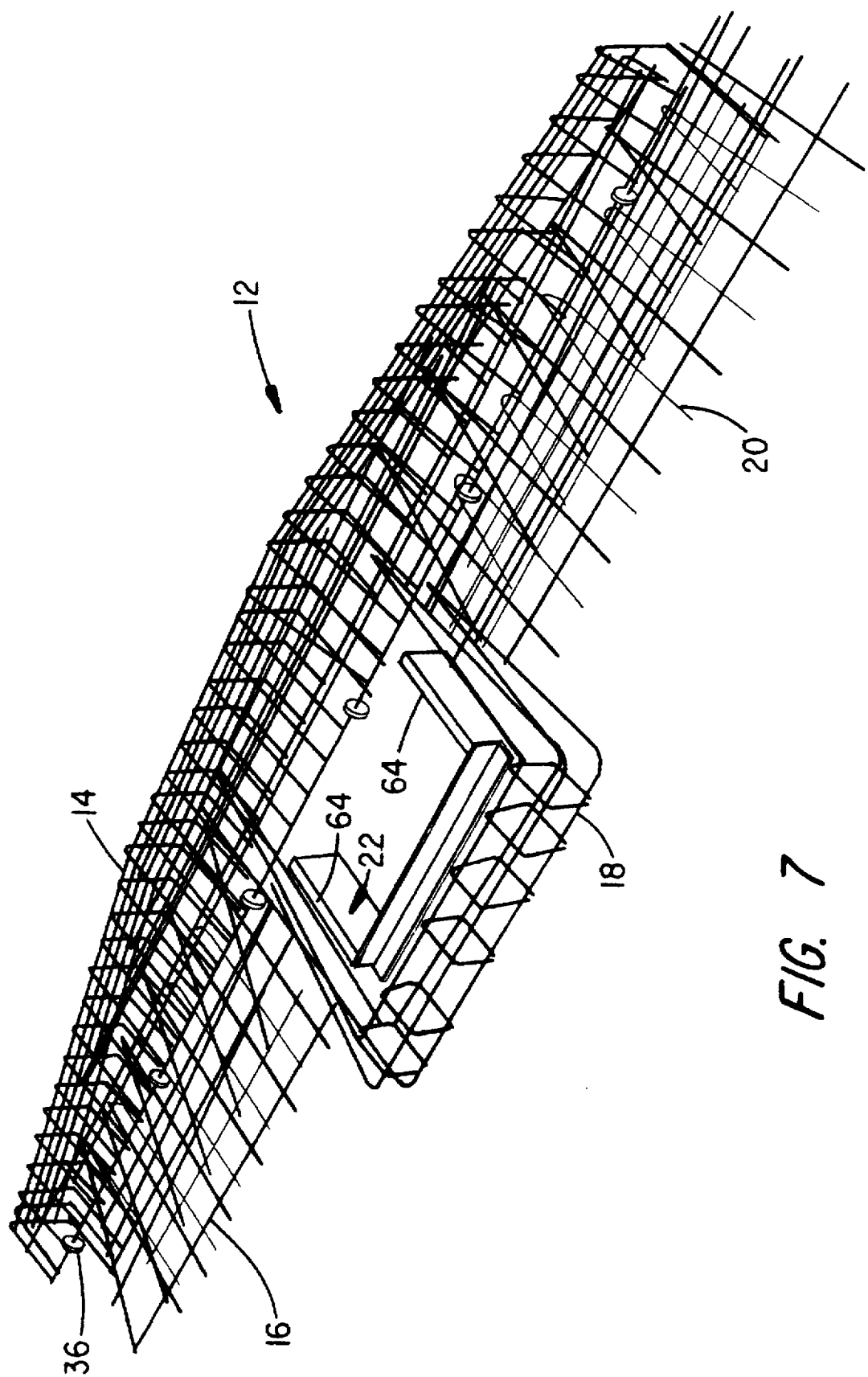
FIG. 7 is a perspective drawing to pre-constructed rebar assemblies for a bi-wing sewer inlet.

The sewer inlet port 4 is cast as a unitary, homogeneous structure. A modular prefabricated steel rebar assembly 12, which is cast into the bi-wing port 4, is shown in partial cutaway at FIG. 2 and in detail at FIG. 7. From FIG. 7 and for a hi-wing sewer inlet port 4, four rebar sub-assemblies 14, 16, 18 and 20 are constructed to fit the assembled casting form 2. A separate, welded steel plate manhole port insert 22 is also fitted to the form 2. For single wing sewer inlets with right or left wings, the rebar assemblies 14, 16 and 20 are appropriately modified or deleted.

Returning attention to FIG. 1, the rebar sub-assemblies 14–20 are aligned to a top cover form insert 23 at a cover cavity 24 and mounted in right and left curb cavities 26 and 28 and an overflow cavity 30 that are defined by the form 2 and cover insert form 23. The right and left insert form 23 is presently constructed in sections 84 and 78 the end sections 84 and 78 of which can be selectively removed to accommodate the sewer inlet being constructed. The end sections are constructed as hollow chambers and fasten to a bottomless center section 82, which is formed to facilitate removal from the cast sewer inlet. A pair of forms 23 might alternatively be constructed, one having both ends and one with only a single end.

Fitted within the overflow cavity 30 is a length of pipe 32 which extends between the manhole port insert 22 and a front wall 33 of an overflow form wall assembly 34. Fitted also to the various rebar subassemblies 14–20 are circular plastic standoffs 36 reference FIG. 7, which appropriately separate the rebar assembly 12 from the walls of the form 2 and the exposed surfaces of the poured concrete.

The pour cavities 24, 26 and 28 are defined by a multi-section rear wall 40, right and left end walls 42 and 44, and right and left front walls 46 and 48. The rear wall 40 and a facing wall 50 bolt to the end walls 42, 44. The front walls 46 and 48 bolt to side walls 52, 54 of the overflow assembly 34 and to the respective end walls 42 and 44. With the cover insert form 23 bolted to the facing wall 50, the rebar assemblies 14–20 and manhole insert 22 are mounted to the assembled form 2.

The cast bi-wing sewer port 4 of FIG. 2 provides approximately 14 feet of inlet cavity 6 and manhole port 8 to receive run-off water. The right and left ends of the inlet cavity 6 extend within the right and left curb wings 56 and 58 to direct the water to the manhole port 8. A concrete cover 60 overlies the inlet cavity 6 and the manhole port 8. A separate grate 62 mounts to ledges 64 at the manhole insert 22 to prevent overly large objects from entering the standpipe. The grate 62 is constructed to cover only the forward region of the manhole port 8 external to the top cover 60. In some constructions, the ledges 64 can extend to completely protect the manhole port 8.

Sewer inlet ports are also frequently provided at intersections and corners. For such locations, right and left, single wing, sewer inlets 70 and 72, shown at FIGS. 4 and 6, are formed with the arrangements of the casting form 2 shown at FIGS. 3 and 5. As earlier discussed, previously known forms did not permit casting multiple types of sewer inlets nor permit broom finishing the cast part. The form 2, however, can be configured to form each of the typically required hi-wing, right and left sewer inlet configurations 4, 70 and 72 shown at FIGS 2, 4 and 6. The sewer inlets are also cast such that the exposed surfaces can be broom finished.

Figure 3:
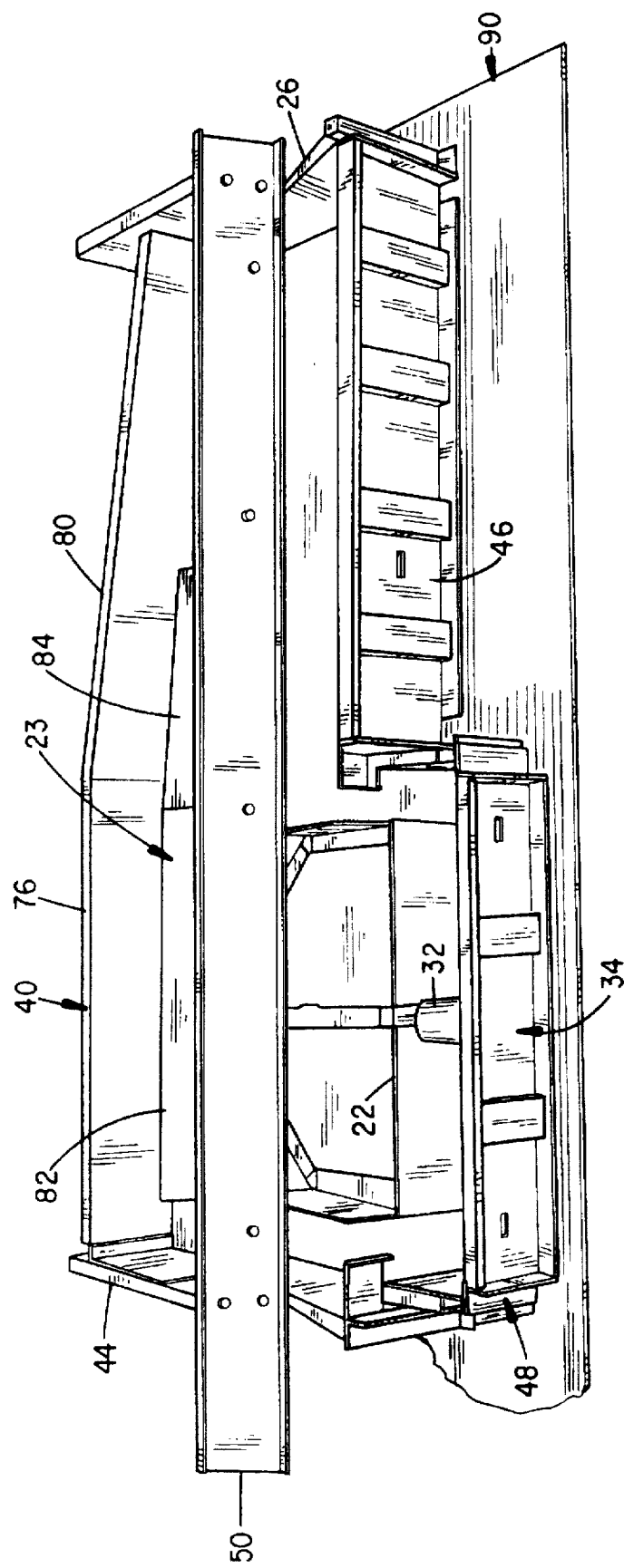
FIG. 3 is a perspective drawing of the casting form arranged to cast a sewer inlet having a right curbing wing.
Figure 4:
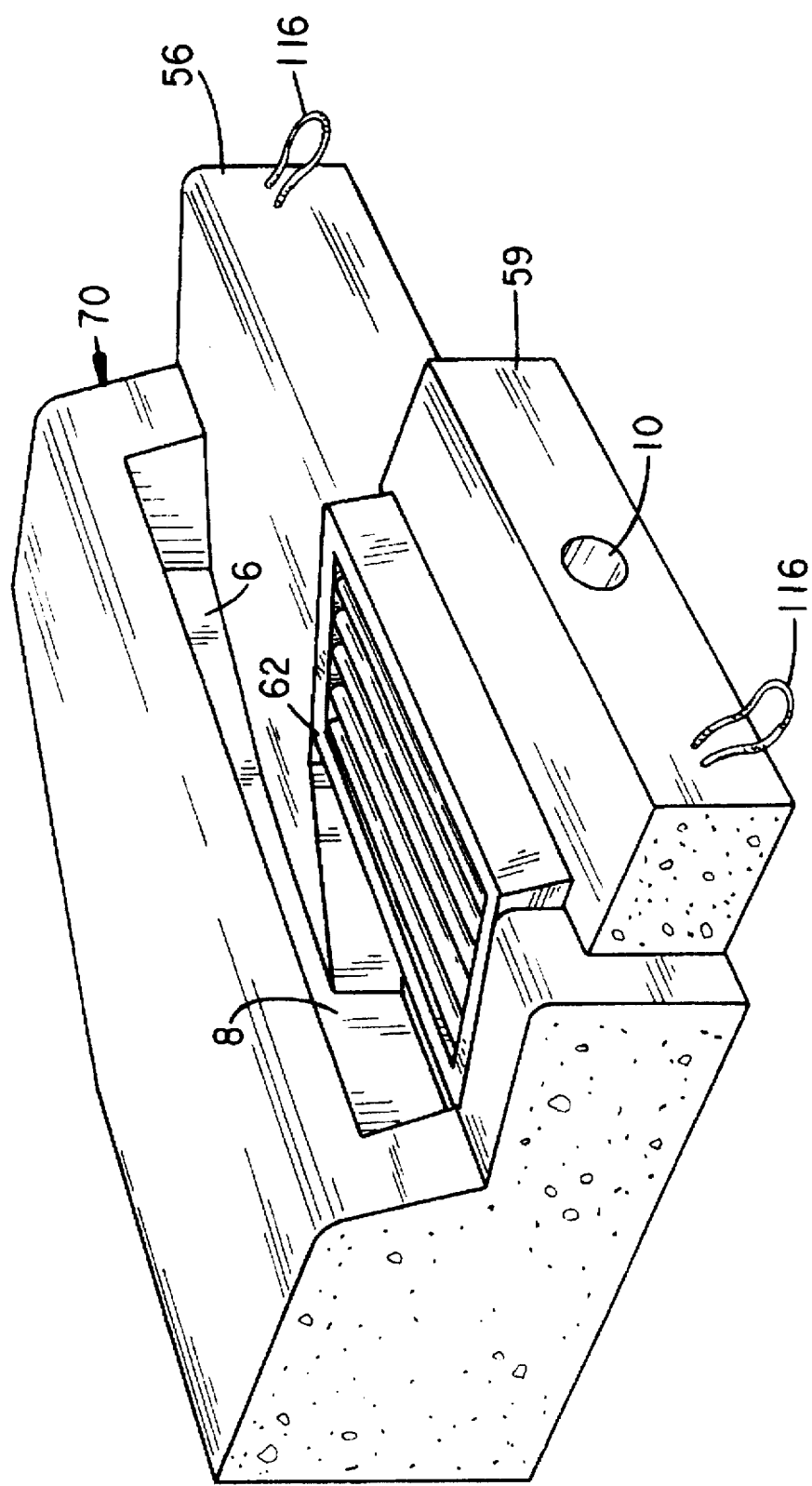
FIG. 4 is perspective drawing of a sewer inlet having a right curbing wing.

With continuing attention to FIG. 1 and also to FIG 3 details to the modular construction of the casting form 2 FIG. 3 particularly shows the form 2 arranged to cast the right single wing sewer inlet 70. In such a circumstance, a left panel 74 of the rear wall 40 and the front wall 48 are removed from the form 2. The left end wall 44 is re-secured to the extension wall assembly 34 and the center panel 76 of the rear wall 40. The facing wall 50 is also re-secured to the re-positioned left end wall 44.

Stated differently, the left wall panel 74 of the rear wall 40, left front wall section 48 and left section 78 of the cover from insert 23 are removed. The left end wall 44 is shifted to the right and coupled to the remaining panels 76, 80 of the rear wall 40, the overflow extension wall assembly 34, and the right front wall section 46. The facing wall 50 is secured to the end walls 42, 44 and the sections 82, 84 of the top cover insert 23. The manhole port 8 and overflow cavity 30 remain unchanged.

FIG. 4, in turn, shows to the right single wing sewer inlet 70 as it appears when removed from the reconfigured form of at FIG. 3. With the exception of the removal of the left curb wing 58 and underlying portion of the inlet cavity 6, the manhole port 8 and overflow port 10 and overflow extension 59 remain the same.

Figure 5:
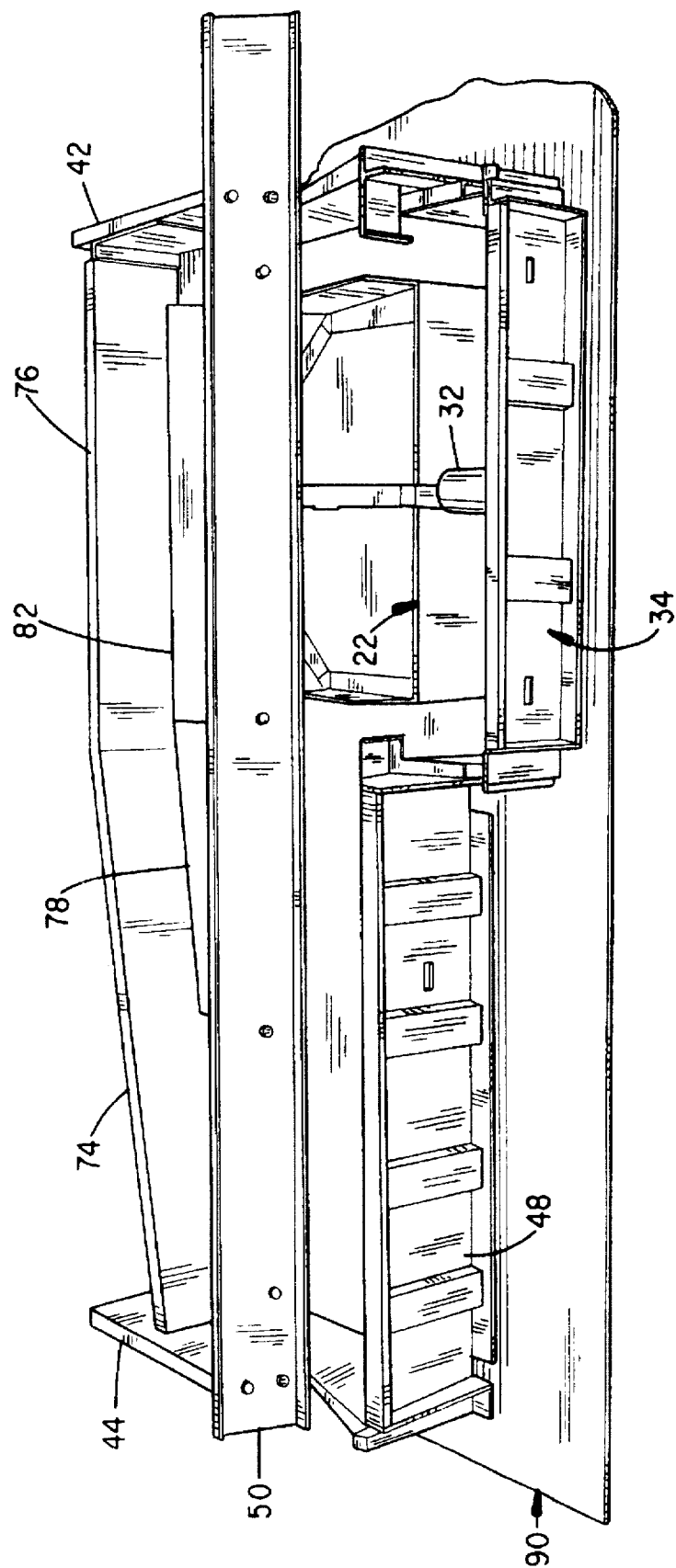
FIG. 5 is a perspective drawing of the casting form arranged to cast a sewer inlet having a left curbing wing.
Figure 6:
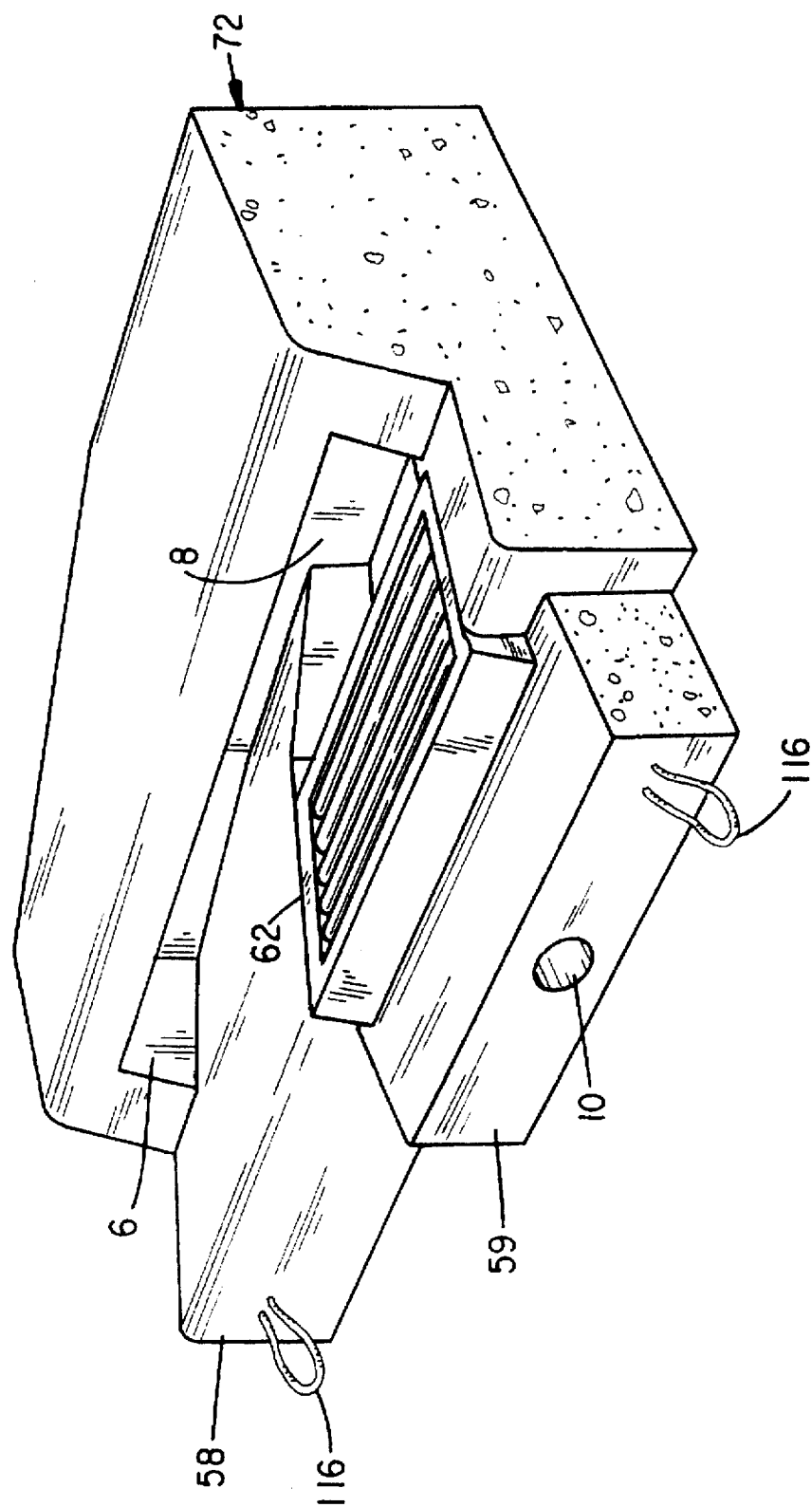
FIG. 6 is perspective drawing of a sewer inlet having a left curbing wing.

The organization of the form 2 to cast a left curb wing sewer inlet 72 is shown at FIG. 5 and the cast left single wing sewer inlet 72 is shown at FIG. 6. The left wing sewer inlet 72 is cast upon modifying the form 2 of FIG. 1 by the rear wall panel 80, and front wall section 46 and re-positioning the right end wall 42 to abut the rear wall panel 76 and overflow assembly 34. The right section 84 of the cover from insert 23 is also removed prior to securing the insert to the facing wall 50 and the facing wall 50 to the end walls 42, 44. As with the right single wing sewer inlet port 72, the inlet cavity 6 is shortened; and the manhole port 8, overflow port 10 and overflow extension 59 remain unchanged reference FIGS. 1 and 6.

Figure 8:
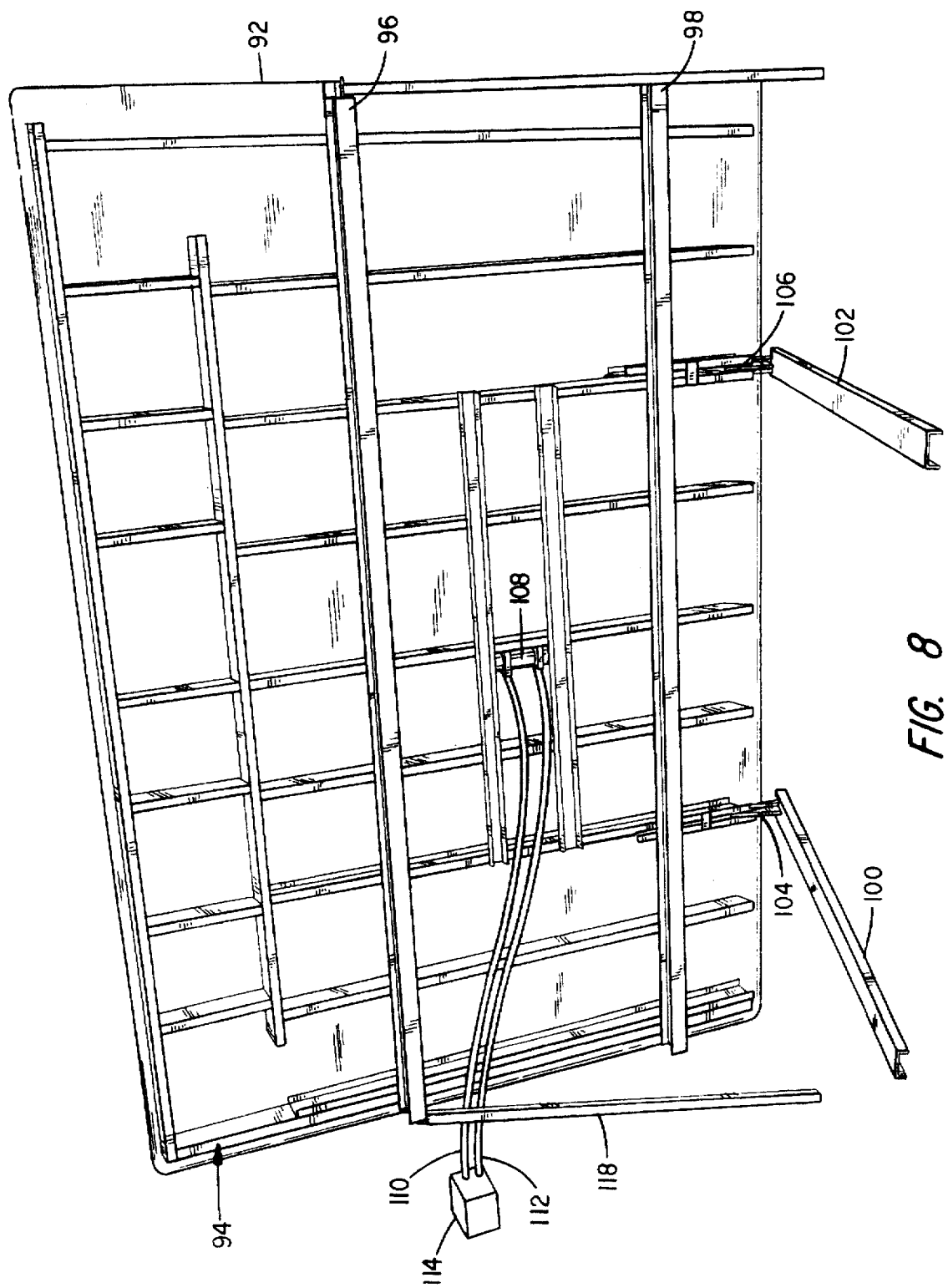
FIG. 8 is a perspective drawing to the casting table with the top shown in an elevated condition and also showing the pivoting linkage and the hydraulic elevators.

Turning attention lastly to FIG. 8, perspective drawing is shown to a casting table 90, which finds application with the form 2, as it appears when elevated.

The table 90 can be used as the bottom wall of the form 2. The table 90 can be constructed to either be stationary or permit rotation. The table 90 is constructed of a substantially continuous panel 92. Depending on the size of the form 2, one or more sections can be welded to form a panel or table top 92. Presently, the table top 92 is sized to provide a working surface of 8×20 feet, although can be constructed to a variety of other sizes. The table 90 can also be used with a variety of other forms found in a typical concrete precasting shop.

Secured to the under surface of the panel 92 is a ribbed support framework 94, which is constructed of appropriate tubular or channel stock that is sized in relation to the anticipated loading of the casting form 2, manhole insert 22, rebar assembly 12 and concrete. A pair of primary longitudinal struts 96 and 98 extend the full width of the panel 92. A pair of support pads or legs 100, 102 extend transverse to the struts 96 98. A pair of hydraulic or pneumatic cylinders 104, 106, which cooperate with a pump 108, extend between and are pivotally connected to the respective support pads 100 and 102 and the strut 98.

Supply and return conduits 110 and 112 extend from the pump 108 to a controlled reservoir 114 and between the pump 108 and the cylinders 104, 106. Depending on the flow direction, the cylinders 104, 106 raise or lower the top panel 92. With the raising of the panel 92 and presuming the removal of the appropriate wall panels 74, 76 and 80 of the rear form wall 40 and facing wall 50, a cast sewer inlet 4, 70 or 72 is ejected from the back of the table 90. With the removal of the facing wall 50 and front walls 46, 48, and overflow extension assembly 34, the cast part can be removed by connecting a hoist to the loops 116.

A support arm 118 is pivotally restrained to the strut 96. Upon substantially raising the table 92, the arm 118 engages the ground to support the table 92 in a substantially upright condition. The exposed top 92 can then be cleaned and treated as necessary with appropriate release agents to facilitate further casting. In normal practice, the casting form 2 can merely rest on the table 90 or alternatively can be bolted to the table to facilitate product removal.

While the invention has been described with respect to a preferred and presently considered modular form assembly, it is to be appreciated a variety of modifications may suggest themselves to those skilled in the art. The following claims should therefore be interpreted to include all those equivalent embodiments within the spirit and scope thereof.

What is claimed:

1. Modular casting apparatus for forming a sewer inlet, comprising:
   a) first and second end walls;
   b) a rear wall comprising a center panel and right and left panels, which right and left panels abut said center panel along one edge and mount to said right and left end walls;
   c) a front wall comprising right and left panels which mount to said right and left end walls and a center wall assembly;
   d) manhole means mounting to said center wall assembly and extending interiorly of a cavity defined by said rear, front and end walls for defining a manhole port;
   e) a facing wall mounting to said right and left end walls;
   f) a bottom wall;
   g) a top cover insert form shaped to form a hollow cavity and mounting to said facing wall and abutting said manhole means, wherein and said facing wall and cover insert form define an inlet cavity which communicates with said manhole port and a cover to said manhole port, and wherein a respective one of said right and left rear wall panels and one of said right and left front walls are selectively removeable such that the walls and insert form are arrangeable to mount to the end walls and facing wall to cast sewer inlets having either right, left or bi-wing curbing wings.

2. Apparatus as set forth in claim 1 including means for supporting a plurality of preformed rebar assemblies within said casting form.

3. Apparatus as set forth in claim 1 wherein said manhole means comprises a three wall metal frame which includes support ledges for a grate which covers said manhole port.

4. Apparatus as set forth in claim 1 wherein said bottom wall comprises a flat panel having a framework including a plurality of struts supported to a lower surface, first and second support legs, cylinder means pivotally mounted to said support legs, and means for extending and retracting a piston of said cylinder means for pivoting said panel relative to said support legs.

5. Apparatus as set forth in claim 4 including a support arm mounted to pivot and support said panel when tilted to a predetermined tilt angle.

6. Apparatus as set forth in claim 1 wherein said top cover insert form comprises a plurality of sections, wherein at least one end section is removeable such that the insert can be inserted into the form when arranged to cast a sewer inlet having either a right or left curbing wing.

7. Modular casting apparatus for forming a curbed sewer inlet, comprising:
   a) first and second end walls;
   b) a rear wall comprising a center panel and right and left panels, which right and left panels abut said center panel along one edge and mount to said right and left end walls;
   c) a front wall comprising right and left panels which mount to said right and left end walls and a center overflow wall assembly;
   d) manhole means mounting to said overflow assembly and extending interiorly of a cavity defined by said rear, front and end walls for defining a manhole port having grate support ledges;
   e) a facing wall mounting to said right and left end walls;
   f) a bottom wall comprising a flat panel, a plurality of panel support legs and means for pivoting said panel relative to said legs;
   g) a top cover insert form including center, right and left wing sections and mounting to said facing wall and abutting said manhole means, wherein and said facing wall and cover insert form define an inlet cavity which communicates with said manhole port and a cover to said manhole port, and wherein respective ones of said right and left rear wall panels, right and left front walls and right and left wing sections are selectively removeable such that the remaining walls and wing sections are arrangeable to mount to the end walls and facing wall to cast sewer inlets having either right, left or bi-wing curbing wings.

8. Apparatus as set forth in claim 7 wherein said right and left wing sections are hollow, and wherein said center section has an open bottom.

9. Apparatus as set forth in claim 1 wherein said bottom wall comprises
   a) a flat panel;
   b) first and second support legs mounted to pivot at said flat panel and
   c) cylinder means having a piston and mounted between said flat panel and said support legs for pivoting said flat panel.

10. Apparatus as set forth in claim 9 including a support arm mounted to pivot with said flat panel and support said flat panel when tilted a predetermined tilt angle.

* * * * *